United States Patent Office 2,828,290
Patented Mar. 25, 1958

2,828,290

COPOLYESTERS OF A GLYCOL, AN AROMATIC DIBASIC ACID, AND A SHORT CHAIN HYDROXY ACID

John R. Caldwell, Kingsport, Tenn., assignor to Eastman Kodak Company, Rochester, N. Y., a corporation of New Jersey No Drawing. Application September 15, 1954
Serial No. 456,339

16 Claims. (Cl. 260—76)

This invention relates to high-melting copolyesters which are suitable for use in preparing films and readily dyeable fibers, and is particularly concerned with the preparation of new and improved copolyesters of a glycol, an aromatic dicarboxylic acid from the group consisting of terephthalic acid, 1,2-di(p-carboxyphenyl)-ethane, 1,2-di(p-carboxyphenoxy)ethane, 4,4'-diphenic acid, and 4,4'-benzophenonedicarboxylic acid, and a short chain hydroxy acid from the group consisting of glycolic acid and hydroxypivalic acid.

A large number of synthetic linear condensation polymers are known to the art, and such polymers are ordinarily prepared by reacting a polybasic organic acid with a polyhydric alcohol, with or without the use of condensation catalysts. The high-molecular weight products which are thereby obtained are capable of being drawn into oriented fibers of the type described in U. S. Patent 2,071,250. The usual polyester fibers, such as those prepared from polyethylene terephthalate, are very difficult to dye, and special methods are usually employed in order to achieve any satisfactory degree of dyeing. Thus, such polyesters must be dyed at superatmospheric pressures with cellulose acetate dyes in order to obtain practical shades. This method is both expensive and time consuming. An alternative process which has been used with such difficultly dyeable polyesters involves the use of a swelling agent or a dye assistant such as phenol, cresol, benzoic acid, dichlorobenzene, or similar material. This process, however, suffers the disadvantage of often causing nonuniform swelling of the fiber with a resultant nonuniform application of the dye. Furthermore, most of the dyeing assistants are objectionable to use because of expense, toxicity, objectionable odor, and similar disadvantages.

Ordinarily, the polyesters prepared from aromatic dicarboxylic acids are preferred because of their high melting point and excellent physical and mechanical properties. Attempts have been made to use the short chain hydroxy acids such as glycolic acid and hydroxypivalic acid to prepare polyesters. Since the hydroxy acid contains, in a single molecule, both the hydroxyl group and the carboxyl group necessary for polyester formation, such attempts have been made using homopolymers of the hydroxy acids. The previously known copolyesters of glycolic acid have relatively low melting points. In general, the known copolyesters of aromatic dicarboxylic acids also have relatively low melting points. Therefore, it is surprising to find that aromatic acid polyesters can be modified with lactic acid and hydroxypivalic acid to give copolyesters that have high melting points. Furthermore, 4-hydroxybutanoic acid and 5-hydroxypentanoic acid form lactones which distill from the reaction mixture and hence a copolyester cannot be made. Prior to this invention it was believed that only long chain compounds containing more than 4 carbon atoms between the functional groups could be used in the preparation of copolyesters which would be suitable for the manufacture of films and fibers. Consequently, it was not realized that high melting, crystalline copolyesters could be obtained with short chain acids such as glycolic and hydroxypivalic.

It is an object of this invention to provide new and improved linear copolyesters which have the desirable high melting point and other mechanical and physical properties characteristic of polyesters of glycols and aromatic dicarboxylic acids but which, in addition, possess a greatly improved dye affinity, especially for cellulose acetate dyes.

Another object of the invention is to prepare copolyesters wherein as much as 70 mole percent of the aromatic dicarboxylic acid has been replaced by either glycolic acid or hydroxypivalic acid without sacrificing the desirable properties imparted by the aromatic dicarboxylic acid while at the same time introducing the desirable properties of such short chain hydroxy acids.

Another object of the invention is to prepare high melting polyesters having improved utility for the manufacture of fibers, films and molded objects.

Other objects will be apparent from the description and claims which follow.

These and other objects are attained by means of this invention wherein new and improved copolyesters are prepared by coreacting to an inherent viscosity of at least 0.4, a glycol containing 2–12 carbon atoms and acidic material consisting of 30–85 mole percent of aromatic dicarboxylic acid selected from the group consisting of terephthalic acid, 1,2-di(p-carboxyphenyl)ethane, 1,2-di-(p-carboxyphenoxy)ethane, 4,4'-diphenic acid, and 4,4'-benzophenonedicarboxylic acid, and 70–15 mole percent of either glycolic acid or hydroxypivalic acid. The resulting copolyesters show greatly improved dye affinity and quite unexpectedly have melting points above 200° C. even when as much as 70 mole percent of the acidic components consists of glycolic acid or hydroxypivalic acid. Thus the copolyesters of this invention have greatly improved dyeing properties without sacrificing the desirable high melting point, tensile strength, elongation, or elastic recovery which characterizes unmodified glycol-aromatic dicarboxylic acid polyesters. Thus the copolyesters embodying the invention are of particular utility in the manufacture of high strength, readily dyeable synthetic fibers and are also of value in the manufacture of photographic film base, electrical insulating sheets, protective wrapping sheets, and molded objects.

The copolyesters of the invention are readily prepared by any of the well known processes employed for preparing unmodified polyesters from a glycol and a single polybasic acid. Thus, the copolyesters of the invention are readily prepared by heating a mixture of the glycol and the acidic components, preferably in ester form, in the presence of a polymerization catalyst. Desirably, the glycol is employed in an amount which is at least equivalent to the amount of aromatic dicarboxylic acid, and preferably in excess on a molar equivalent basis. Thus for example, 25–100 mole percent excess of glycol is desirably employed in order to facilitate the reaction. The copolyester formation is also facilitated by the use of a condensation catalyst and preferably an organometallic catalyst, a large number of which are described in the copending applications of John R. Caldwell, Serial Nos. 313,061 through 313,071 inclusive, filed October 3, 1952. The catalysts which are preferred for use in practicing this invention are the titanium compounds specifically disclosed in application Serial No. 313,072, tin compounds as disclosed in application Serial No. 313,078, and aluminum compounds, as disclosed in application Serial No. 313,077. In accordance with usual practice, especially when such catalysts are employed, the esterified acids and/or esterified glycols can be readily used instead of the free acids and free glycols. The catalyst is desirably employed in an amount of from 0.005% to 0.01%, but preferably from 0.006% to 0.008% based on the weight of the reactants. The copolyester formation is effectively between the glycol, the aromatic dicarboxylic acid, and the glycolic or hydroxypivalic acid, whether such glycols and acids are introduced in free or esterified form. Consequently, it will be understood that the term "glycol" and the term "acid" as employed herein and in the appended claims describe the actual reactants in situ, such reactants in situ being the same with the introduction initially of the alkyl esters of the glycols and acids as well as the unesterified compounds. The alkyl esters which are preferably employed are those wherein the alkyl groups contain 1–6 carbon atoms. When the polyester formation is effected, the initial reaction involves ester interchange between the glycol and the aromatic dicarboxylic acid with the splitting out of an alkyl alcohol, and hence the presence of the alkyl groups does not affect the course of the reaction or the identity of the copolyesters obtained therefrom.

In practicing the invention, either glycolic or hydroxypivalic acid can be used to form 15–70 mole percent of the total amount of acidic components. Hydroxypivalic acid is preferred in most cases. Although the glycolic or hydroxypivalic acid can be used in amounts of 15–70 mole percent based on the total weight of acids, such hydroxy acids are preferably employed in an amount of 15–50 mole percent for best results.

The aromatic dicarboxylic acid which is employed in an amount of 30–85 mole percent, and preferably 50–85 mole percent, based on the total weight of acids, can be one or more of the acids from the group consisting of terephthalic acid, 1,2-di(p-carboxyphenyl)ethane, 1,2-di-(p-carboxyphenoxy)ethane, 4,4'-diphenic acid, and 4,4'-benzophenonedicarboxylic acid. The aromatic dicarboxylic acid can be employed in either free or esterified form with the alkyl esters containing 1–6 carbon atoms in the alkyl group being preferred. In the condensation reaction, the aromatic dicarboxylic acid first condenses with an equivalent amount of glycol, and hence the glycol and aromatic dicarboxylic acid are employed in amounts wherein the glycol is at least equivalent to the aromatic dicarboxylic acid. When the glycol is present in an excess, the reaction still proceeds on a molar equivalent basis between the glycol and the aromatic dicarboxylic acid with the excess glycol distilling out of the reaction mixture during the course of the reaction.

Any of the well known glycols containing 2–12 carbon atoms can be used in practicing the invention. The glycols which are preferably employed are the polymethylene glycols containing 2–10 carbon atoms such as ethylene glycol, trimethylene glycol, tetramethylene glycol, pentamethylene glycol, hexamethylene glycol, octamethylene glycol, and decamethylene glycol, although ether glycols such as diethylene glycol or branched chain glycols, such as 2,2-dimethyl-1,3-propanediol, or 2,2-dimethyl-1,4-butanediol, can be used with good results. The polyhydric alcohols containing 3 or more hydroxyl groups are usually not employed since they function as cross-linking agents, and it is ordinarily desired to form linear polymers free of cross-linking.

In forming the copolyesters of this invention, it is usually desirable to carry out the reaction in at least two stages. The first stage of the reaction is carried out by heating a mixture of the glycol, aromatic dicarboxylic acid, and glycolic or hydroxypivalic acid in the presence of a condensation catalyst at a temperature of 180–230° C. and atmospheric pressure, whereby low molecular weight glycol esters are formed, and the alcohol liberated by ester interchange is distilled out. During this initial stage, as well as during the subsequent polymerization, oxygen and moisture are excluded from the reaction mixture. The second stage of the reaction can be carried out either by melt polymerization or by a solid phase process. In the former method, the temperature of the reaction mixture is raised to 250–300° C. in order to maintain the copolyester in molten form. Some of the excess glycol is distilled off at this time. The reaction mixture is then subjected to vacuum, and the heating above the melting point is continued with agitation of the mixture in order to facilitate the escape of volatile products from the highly viscous melt. The heating is carried out until the resulting polymer forms a fiber when a rod is touched to the surface of the melt and quickly pulled away. Ordinarily, the polymerization is carried out until the polymer thus formed has an inherent viscosity of at least 0.4 and desirably at least 0.6.

In an alternative process, the second stage of the reaction can be carried out by the solid phase process. When this method is used, a prepolymer having an inherent viscosity of 0.15 to 0.30 is prepared by stirring the reaction mixture under vacuum as described hereinabove. This prepolymer is then removed from the reaction vessel and pulverized to a particle size of about 0.01–0.03 inch. The pulverized prepolymer is then heated in vacuum at a temperature below its melting point or in an inert gas stream at such temperature. The temperature employed is usually in the range of 200–260° C. depending upon the melting point of the copolyester. As before, the polymerization is carried on until the resulting copolyester has an inherent viscosity of at least 0.4 and desirably at least 0.6.

The resulting copolyesters prepared in accordance with this invention are highly valuable for the manufacture of fibers, films and molded objects. Fibers are readily prepared from the polymers by the usual melt spinning or solvent spinning processes, and the fibers thereby obtained possess the highly advantageous combination of characteristics of having a melting point well above 200° C., a sticking temperature of at least about 200° C., excellent dyeability, high tensile strength, and good elongation and elastic recovery. Such improved results are obtained even when the glycolic or hydroxypivalic acid is employed in an amount of as much as 70 mole percent based on the combined weight of the acids, although an amount of glycolic or hydroxypivalic acid of from 15–50 mole percent is desirably employed. Because of the excellent mechanical properties and high melting points, the copolyesters of the invention are also useful in the preparation of molded objects by the usual molding methods and are useful for the formation of other shaped objects such as films, sheets, and the like by extrusion or casting methods applicable to polyesters generally. Films prepared from the copolyesters of the invention have excellent utility as photographic film base for either black-and-white or color film. Thus, the copolyesters are useful as support layers for bearing photosensitive emulsions such as silver halide emulsions. In film form, the copolyesters of the invention are also useful as electrical insulating sheets, and as protective wrappings.

The invention is illustrated by the following examples of preferred embodiments thereof. It will be understood, however, that the examples are included merely for purposes of illustration and are not intended to limit the scope of the invention unless otherwise specifically indicated.

*Example 1*

A charge of 194 g. (1 mole) of dimethyl terephthalate, 43 g. (0.25 mole) of butyl hydroxypivalate and 100 g. (1.5 moles) of ethylene glycol was placed in a reaction vessel equipped with a stirrer, a distillation column, and an inlet for purified nitrogen. A solution of 0.15 g. of lithium aluminum ethylate in 5 cc. of ethyl alcohol was added as catalyst. The mixture was stirred at 190–200° C. in a nitrogen atmosphere. During this initial heating period of 2 hours, ester interchange took place, and a mixture of methyl and butyl alcohol distilled from the reaction mixture. The temperature was then raised to 260–270° C. and held for one hour. A vacuum of 0.1 mm. was then applied, and the melt was stirred at 260–270° C. for 3 hours. The resulting crystalline polymer melted at 240–244° C. and had an inherent viscosity of 0.82 when measured in a solution of 60 phenol-40 tetrachloroethane. The polymer gave strong elastic fibers which dyed well with cellulose acetate dyes.

It will be noted that this composition contains 20 mole percent of hydroxypivalic acid in combined form, based on the total weight of acid components. A copolyester of terephthalic acid, ethylene glycol, and 20 mole percent of glutaric acid having the same number of carbon atoms as hydroxypivalic acid was described by Edgar and Hill in J. Poly. Science, 8, 1 (1952). The melting points of the copolyesters are compared below:

| | M. P., ° C. |
|---|---|
| Polyethylene terephthalate (ethylene glycol+terephthalic acid) | 264 |
| Ethylene glycol+terephthalic acid+20 mole percent hydroxypivalic acid | 240 |
| Etheylene glycol+terephthalic acid+20 mole percent glutaric acid | 205 |

As can be seen from the table, the presence of 20 mole percent of hydroxypivalic acid lowers the melting point of the original polyester by only 24° C. whereas the presence of 20 mole percent of glutaric acid lowers the melting point by 60° C. It is thus apparent that the hydroxypivalic acid copolyester is of considerably greater utility in the preparation of synthetic fibers because of the higher melting point.

Example 2

A copolyester was prepared as in the perceding example having the composition 0.70 mole of terephthalic acid, 0.30 mole of glycolic acid, and 0.70 mole of ethylene glycol, in combined form. This copolyester melted at 210–225° C. and was particularly useful as a molding plastic. It was also valuable for the production of photographic film base.

Example 3

As has been indicated, any of the aromatic dicarboxylic acids defined hereinabove can be employed in practicing the invention. Thus, a copolyester was prepared in similar fashion having the composition of 0.6 mole of 1,2-di(p-carboxyphenoxy)ethane, 0.4 mole hydroxypivalic acid, and 0.6 mole of ethylene glycol, in combined form. The resulting copolyester melted above 200° C. and was useful as a molding plastic and a photographic film base.

Example 4

Ethylene glycol is usually employed for convenience as the glycol component of the polyester, but any of the other glycols containing 2–12 carbon atoms, and particularly the polymethylene glycols of 2–10 carbon atoms, can be employed with excellent results. Thus, a copolyester was made containing, in combined form, 0.5 mole of 4,4'-diphenic acid, 0.5 mole of hydroxypivalic acid, and 0.5 mole of butanediol. The resulting copolyester softened in the range of 150°–170° C. Because of its wide softening range, this copolyester was particularly useful as a molding plastic for compression molding processes.

Example 5

Another copolyester of particular utility as a molding plastic was prepared in similar fashion and had the composition in combined form of 0.4 mole of 4,4'-benzophenonedicarboxylic acid, 0.6 mole of glycolic acid, and 0.6 mole of ethylene glycol.

Example 6

Another copolyester embodying the invention was prepared having the composition of 0.3 mole of 4,4'-diphenic acid, 0.7 mole of hydroxypivalic acid, and 0.3 mole of trimethylene glycol. This product was particularly useful as a molding plastic.

Example 7

A similar copolyester was prepared having the composition of 0.2 mole of 4,4'-benzophenonedicarboxylic acid, 0.8 mole of hydroxypivalic acid, and 0.2 mole of ethylene glycol in combined form. The product was particularly useful as a molding plastic.

Example 8

The polymers of particular utility for the production of textile fibers contain hydroxypivalic acid in an amount of from 15 to 50 mole percent of the total weight of acidic components. Thus, a typical copolyester for use in preparing textile fibers was made having the composition 0.85 mole of 4,4'-benzophenonedicarboxylic acid, 0.15 mole of hydroxypivalic acid, and 0.85 mole of pentanediol.

Example 9

A copolyester was prepared in accordance with the process of Example 1, having the composition of 0.16 mole of hydroxypivalic acid, 0.84 mole of terephthalic acid, and 0.84 mole of ethylene glycol, in combined form. The copolyester melted at 250–255° C. and gave fibers that dyed well with cellulose acetate dyes.

Example 10

A mixture of 0.2 mole of butyl hydroxypivalate, 0.8 mole of 1,2-di-(p-carboxyphenyl)ethane dibutyl ester, and 1.5 mole of ethylene glycol was preheated at 170–180° C. in the presence of 0.25 gram of potassium titanium butoxide in 10 cc. of butyl alcohol for one hour in a stream of pure nitrogen. The temperature was then raised to 190–200° C. and held for 3 hours. The temperature was then raised to 230–240° C. and held for 30 minutes. A vacuum was applied, and the stirring was continued for 5–10 minutes. The resulting prepolymer was then removed from the reaction vessel and granulated to a particle size of 0.01–0.03 inch. The granulated prepolymer was then heated in a vacuum at a temperature just below its melting point for 4 hours until a copolyester having an inherent viscosity above 0.6 was obtained. This copolyester melted at 210–215° C. and was useful for the preparation of textile fibers, photographic film base, and molded plastics.

Thus by means of this invention a new and highly useful class of copolyesters is readily prepared, and the polymers thus obtained possess the beneficial properties imparted by all of the components without suffering the corresponding disadvantages which might be expected. The copolyesters can be prepared by either batch or continuous processes, and the method of preparation can be varied in accordance with usual practices for preparing polyesters. If desired, the polyesters can be compounded with other polymeric materials, extenders, additives, fillers, pigments and similar compounding ingredients. The composition of the copolyesters embodying this invention can be varied over the ranges defined herein using any of the combinations of glycol, aromatic dicarboxylic acid as defined, and glycolic or hydroxypivalic acid with excellent results.

Although the invention has been described in considerable detail with particular reference to certain preferred embodiments thereof, variations and modifications can be effected within the spirit and scope of the invention as described hereinabove and as defined in the appended claims.

I claim:

1. A copolyester obtained by simultaneous coreaction of a glycol containing 2–12 carbon atoms, and acidic material consisting of 50–85 mole percent of aromatic dicarboxylic acid selected from the group consisting of terephthalic acid, 1,2-di(p-carboxyphenyl)ethane, 1,2-di(p-carboxyphenoxy)ethane, 4,4'-diphenic acid and 4,4'-benzophenonedicarboxylic acid, and 50–15 mole percent of a short chain hydroxy acid selected from the group consisting of glycolic acid and hydroxypivalic acid, said copolyester being spinnable and having a melting point of at least 200° C., said coreaction being effected at 180–300° C. to an inherent viscosity of at least 0.4 using an amount of glycol at least equivalent to the amount of said acidic material.

2. A copolyester obtained by simultaneous coreaction of a polymethylene glycol of 2–10 carbon atoms, hydroxypivalic acid, and an aromatic dicarboxylic acid selected from the group consisting of terephthalic acid, 1,2-di(p-carboxyphenyl)ethane, 1,2-di-(p-carboxyphenoxy)ethane, 4,4'-diphenic acid and 4,4'-benzophenonedicarboxylic acid, the total weight of combined acidic components being composed of 50–85 mole percent of said aromatic dicarboxylic acid and 50–15 mole percent of said hydroxy pivalic acid, said copolyester being spinnable and having a melting point of at least 200° C., said coreaction being effected at 180–300° C. to an inherent viscosity of at least 0.4 using an amount of glycol at least equivalent to the amount of said acidic material.

3. A copolyester obtained by simultaneous coreaction of a polymethylene glycol of 2–10 carbon atoms, terephthalic acid and hydroxypivalic acid, said terephthalic acid amounting to 50–85 mole percent and said hydroxypivalic acid amounting to 50–15 mole percent of the total weight of said acids, said copolyester being spinnable and having a melting point of at least 200° C., said coreaction being effected at 180–300° C. to an inherent viscosity of at least 0.4 using an amount of glycol at least equivalent to the amount of said acidic material.

4. A copolyester obtained by simultaneous coreaction of a polymethylene glycol of 2–10 carbon atoms, 1,2-di(p-carboxyphenoxy)ethane, and hydroxypivalic acid, said 1,2-di(p-carboxyphenoxy)ethane amounting to 50–85 mole percent and said hydroxypivalic acid amounting to 50–15 mole percent of the total weight of said acids, said copolyester being spinnable and having a melting point of at least 200° C., said coreaction being effected at 180–300° C. to an inherent viscosity of at least 0.4 using an amount of glycol at least equivalent to the amount of said acidic material.

5. A copolyester obtained by simultaneous coreaction of a polymethylene glycol of 2–10 carbon atoms, 4,4'-diphenic acid, and hydroxypivalic acid, said 4,4'-diphenic acid mounting to 50–85 mole percent and said hydroxypivalic acid amounting to 50–15 mole percent of the total weight of said acids, said copolyester being spinnable and having a melting point of at least 200° C., said coreaction being effected at 180–300° C. to an inherent viscosity of at least 0.4 using an amount of glycol at least equivalent to the amount of said acidic material.

6. A copolyester obtained by simultaneous coreaction of a polymethylene glycol of 2–10 carbon atoms, 4,4'-benzophenonedicarboxylic acid, and hydroxypivalic acid, said 4,4'-benzophenonedicarboxylic acid amounting to 50–85 mole percent and said hydroxypivalic acid amounting to 50–15 mole percent of the total weight of said acids, said copolyester being spinnable and having a melting point of at least 200° C., said coreaction being effected at 180–300° C. to an inherent viscosity of at least 0.4 using an amount of glycol at least equivalent to the amount of said acidic material.

7. A copolyester obtained by simultaneous coreaction of a polymethylene glycol of 2–10 carbon atoms, 1,2-di(p-carboxyphenyl)ethane, and hydroxypivalic acid, said 1,2-di(p-carboxyphenyl)ethane amounting to 50–85 mole percent and said hydroxypivalic acid amounting to 50–15 mole percent of the total weight of said acids, said copolyester being spinnable and having a melting point of at least 200° C., said coreaction being effected at 180–300° C. to an inherent viscosity of at least 0.4 using an amount of glycol at least equivalent to the amount of said acidic material.

8. A copolyester obtained by simultaneous coreaction of ethylene glycol, terephthalic acid and hydroxypivalic acid wherein the ethylene glycol and terephthalic acid are combined in substantially equimolar proportions and terephthalic acid amounts to from 50–85 mole percent and said hydroxypivalic acid amounts to 50–15 mole percent of the total weight of said acids, said copolyester being spinnable and having a melting point of at least 200° C., said coreaction being effected at 180–300° C. to an inherent viscosity of at least 0.4 using an amount of glycol at least equivalent to the amount of said acidic material.

9. Synthetic fiber composed of a copolyester obtained by simultaneous coreaction of a glycol containing 2–12 carbon atoms, and acidic material consisting of 50–85 mole percent of aromatic dicarboxylic acid selected from the group consisting of terephthalic acid, 1,2-di(p-carboxyphenyl)ethane, 1,2 - di(p - carboxyphenoxy)ethane, 4,4'-diphenic acid and 4,4'-benzophenonedicarboxylic acid, and 50–15 mole percent of a short chain hydroxy acid selected from the group consisting of glycolic acid and hydroxypivalic acid, said copolyester being spinnable and having a melting point of at least 200° C., said coreaction being effected at 180–300° C. to an inherent viscosity of at least 0.4 using an amount of glycol at least equivalent to the amount of said acidic material.

10. Readily dyeable high melting synthetic fiber composed of a copolyester of substantially equimolar proportions of ethylene glycol and terephthalic acid, and hydroxypivalic acid amounting to 15–50 mole percent of the total weight of said acids, said copolyester being spinnable and having a melting point of at least 200° C., said coreaction being effected at 180–300° C. to an inherent viscosity of at least 0.4 using an amount of glycol at least equivalent to the amount of said acidic material.

11. The method of making a high melting copolyester of improved dye affinity which comprises simultaneously coreacting, to an inherent viscosity of at least 0.4, a glycol containing 2–12 carbon atoms, and acidic material consisting of 30–85 mole percent of aromatic dicarboxylic acid selected from the group consisting of terephthalic acid, 1,2-di(p-carboxyphenyl)ethane, 1,2-di(p-carboxyphenoxy)ethane, 4,4'-diphenic acid and 4,4'-benzophenonedicarboxylic acid, and 70–15 mole percent of a short chain hydroxy acid selected from the group consisting of glycolic acid and hydroxypivalic acid, said coreaction being effected at 180–300° C. with said glycol being present in an amount at least equivalent to the total amount of acid.

12. The method which comprises forming a high melting copolyester of improved dye affinity by coreacting simultaneously at 180–300° C. to an inherent viscosity of at least 0.4 a mixture of terephthalic acid, a polymethylene glycol of 2–10 carbon atoms in an amount at least equivalent to said terephthalic acid, and 15–50 mole percent of hydroxypivalic acid based on the combined weight of said hydroxypivalic acid and said terephthalic acid.

13. The method which comprises forming a high melting copolyester of improved dye affinity by coreacting simultaneously at 180–300° C. to an inherent viscosity of at least 0.4 a mixture of 4,4'-diphenic acid, a polymethylene glycol of 2–10 carbon atoms in an amount at least equivalent to said 4,4'-diphenic acid, and 15–50 mole percent of hydroxypivalic acid based on the combined weight of said hydroxypivalic acid and said 4,4'-diphenic acid.

14. The method which comprises forming a high melting copolyester of improved dye affinity by coreacting simultaneously at 180–300° C. to an inherent viscosity of at least 0.4 a mixture of 1,2-di(p-carboxyphenyl)ethane, a polymethylene glycol of 2–10 carbon atoms in an amount at least equivalent to said 1,2-di(p-carboxyphenyl)ethane, and 15–50 mole percent of hydroypivalic acid based on the combined weight of said hydroxypivalic acid and said 1,2-di(p-carboxyphenyl)ethane.

15. The method which comprises forming a high melting copolyester of improved dye affinity by coreacting simultaneously at 180–300° C. to an inherent viscosity of at least 0.4 a mixture of 1,2-di(p-carboxyphenoxy)ethane, a polymethylene glycol of 2–10 carbon atoms in an amount at least equivalent to said 1,2-di(p-carboxyphenoxy)ethane, and 15–50 mole percent of hydroxypivalic acid based on the combined weight of said hydroxypivalic acid and said 1,2-di(p-carboxyphenoxy)ethane.

16. The method which comprises forming a high melting copolyester of improved dye affinity by coreacting simultaneously at 180–300° C. to an inherent viscosity of at least 0.4 a mixture of 4,4'-benzophenonedicarboxylic acid, a polymethylene glycol of 2–10 carbon atoms in an amount at least equivalent to said 4,4'-benzophenonedicarboxylic acid, and 15–50 mole percent of hydroxypivalic acid based on the combined weight of said hydroxypivalic acid and said 4,4'-benzophenonedicarboxylic acid.

References Cited in the file of this patent

UNITED STATES PATENTS

| | | |
|---|---|---|
| 2,312,879 | Christ | Mar. 2, 1943 |
| 2,683,136 | Higgins | July 6, 1954 |